(12) United States Patent
Okuda

(10) Patent No.: US 10,086,773 B2
(45) Date of Patent: *Oct. 2, 2018

(54) IN-VEHICLE CAMERA

(71) Applicant: DENSO CORPORATION, Kariya, Aichi-pref. (JP)

(72) Inventor: Syo Okuda, Nagoya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/831,512

(22) Filed: Dec. 5, 2017

(65) Prior Publication Data

US 2018/0093620 A1 Apr. 5, 2018

Related U.S. Application Data

(63) Continuation of application No. 14/384,423, filed as application No. PCT/JP2013/055631 on Mar. 1, 2013, now Pat. No. 9,862,332.

(30) Foreign Application Priority Data

Mar. 19, 2012 (JP) .................................. 2012-062350

(51) Int. Cl.
*B60R 11/04* (2006.01)
*B60R 11/00* (2006.01)

(52) U.S. Cl.
CPC ....... *B60R 11/04* (2013.01); *B60R 2011/0026* (2013.01)

(58) Field of Classification Search
USPC ....................................................... 348/148
See application file for complete search history.

(56) References Cited

U.S. PATENT DOCUMENTS 5,487,522 A 1/1996 Hook
6,587,152 B1 * 7/2003 Sharp ..................... H04N 5/232
348/148

(Continued)

FOREIGN PATENT DOCUMENTS

CN 201457247 U 5/2010
CN 103303208 A 9/2013

(Continued)

OTHER PUBLICATIONS

International Search Report and Written Opinion (in Japanese with English Translation) for PCT/JP2013/055631, dated May 28, 2013; ISA/JP.

(Continued)

*Primary Examiner* — Christopher S Kelley
*Assistant Examiner* — Asmamaw G Tarko
(74) *Attorney, Agent, or Firm* — Harness, Dickey & Pierce, P.L.C.

(57) ABSTRACT

In an in-vehicle camera 1, when an in-vehicle camera body 5 is hooked on a hook portion 33 of a bracket 3 attached to a windshield, a leaf spring 34 presses the in-vehicle camera body 5 against the bracket 3 to fix the in-vehicle camera body to the bracket 3. Therefore, the in-vehicle camera body 5 can be attached to the windshield without permitting the windshield to come off from the vehicle by the bracket's being strongly pushed such as by a jig, or without permitting the jig to scratch the windshield. Since the in-vehicle camera body is fixed to the bracket 3 by being pressed against the bracket 3 by the leaf spring 34, there is no problem of causing backlash relative to the bracket 3.

4 Claims, 8 Drawing Sheets

(56) References Cited

U.S. PATENT DOCUMENTS

| | | | |
|---|---|---|---|
| 2009/0046150 A1* | 2/2009 | Hayakawa | H04N 5/2253 348/148 |
| 2010/0065707 A1* | 3/2010 | Hansel | B60R 11/04 248/298.1 |
| 2012/0310519 A1* | 12/2012 | Lawlor | B60R 1/12 701/301 |
| 2014/0253730 A1 | 9/2014 | DeWard et al. | |
| 2015/0042874 A1 | 2/2015 | Takeda | |

FOREIGN PATENT DOCUMENTS

| | | |
|---|---|---|
| DE | 10237606 A1 | 3/2004 |
| JP | S62239189 A | 10/1987 |
| JP | 2003011723 A | 1/2003 |
| JP | 2004082829 A | 4/2004 |
| JP | 2006180368 A | 7/2006 |
| JP | 2009044342 A | 2/2009 |
| JP | 2009545760 A | 12/2009 |

OTHER PUBLICATIONS

International Preliminary Report on Patentability (with English translation) dated Oct. 2, 2014 for PCT/JP2013/055631.
Office Action dated Nov. 3, 2015 in corresponding Chinese Application No. 201380014862.3 with English translation.

* cited by examiner

FIG.3
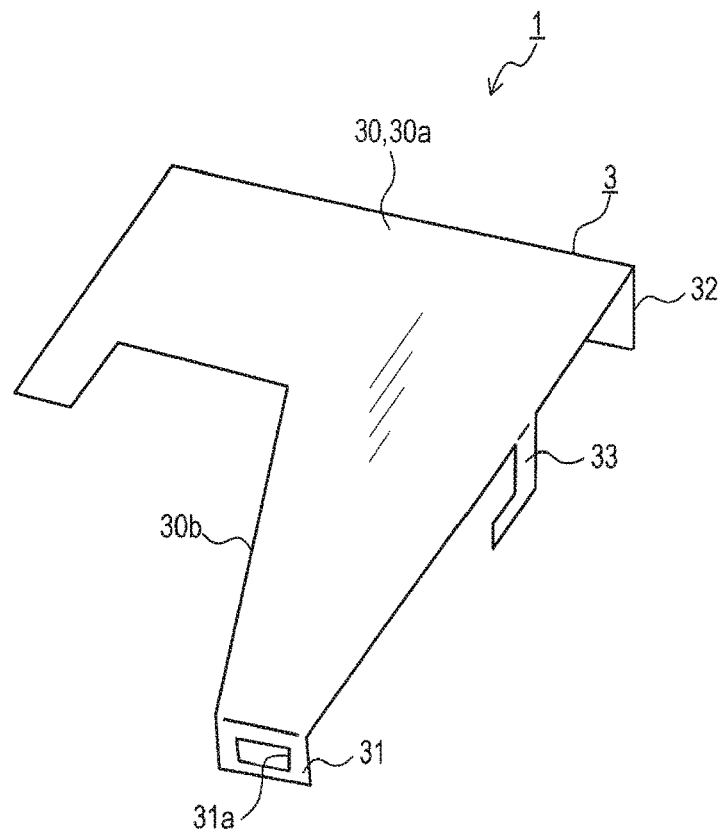
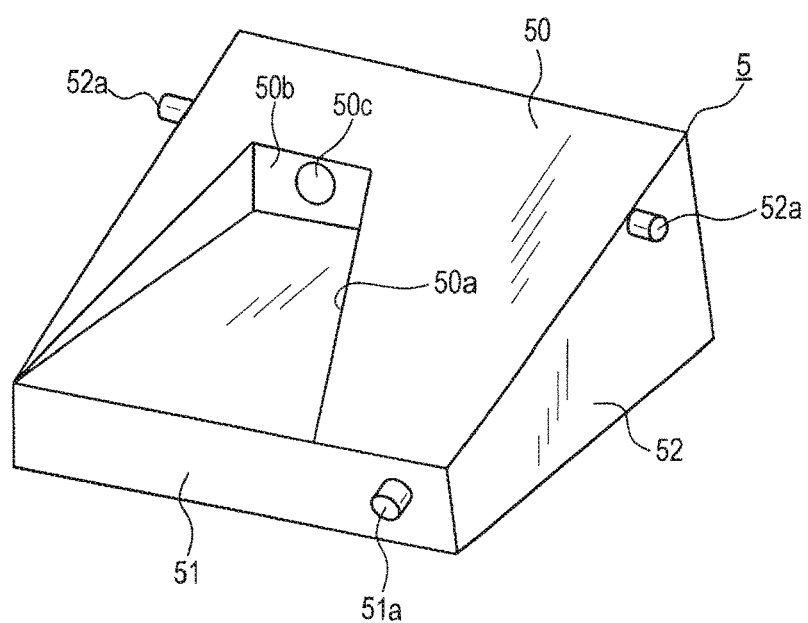

IN-VEHICLE CAMERA

CROSS-REFERENCE TO RELATED APPLICATIONS

This application is a Continuation Application of U.S. Ser. No. 14/384,423 filed Sep. 11, 2014, which is a U.S. National Phase Application under 35 U.S.C. 371 of International Application No. PCT/JP2013/055631 filed on Mar. 1, 2013 and published in Japanese as WO 2013/141000 A1 on Sep. 26, 2013, which is based on and claims the benefit of priority from Japanese Patent Application No. 2012-062350 filed Mar. 19, 2012. The entire disclosures of all of the above applications are incorporated herein by reference.

BACKGROUND OF THE INVENTION

Technical Field

The present invention relates to an in-vehicle camera that is attached to a windshield from inside the vehicle.

Background Art

An in-vehicle camera that monitors the conditions ahead of the vehicle includes a bracket attached to a windshield and an in-vehicle camera body fixed to the bracket.

Such an in-vehicle camera is attached to the windshield in the course of manufacturing the vehicle. Specifically, in the manufacture, the bracket is attached to the windshield in advance and then the windshield is mounted to the vehicle body using an adhesive, followed by screwing the in-vehicle camera body to the bracket.

According to another method, an in-vehicle camera, although not aimed to monitor the conditions ahead of the vehicle, is attached to a windshield as follows. Specifically, in this method, a button is attached to the windshield in advance, while a hook, to which the button is fitted, is mounted to an in-vehicle camera body, and the hook is moved along the windshield so as to be hooked on the button (e.g., see JP-A-2004-082829).

However, the step of attaching the windshield to the in-vehicle camera body is performed after mounting the windshield to the vehicle using an adhesive, i.e. performed before the adhesive is completely cured.

Therefore, when the bracket is pushed strongly such as by a jig in mounting the in-vehicle camera to the bracket, the windshield may come off from the vehicle, or the windshield may be scratched by the jig.

The method of attaching a button to a windshield in advance, followed by hooking thereon a hook provided to the in-vehicle camera body involves the following problem. The problem is that, since tolerances are set to the button and the hook respectively, the in-vehicle camera body is not completely fixed to the windshield.

In the case of an in-vehicle camera for monitoring the conditions ahead of the vehicle, a possible occurrence of looseness due to the tolerances leads to a problem of disabling correct monitoring of the conditions ahead of the vehicle.

Specifically, an in-vehicle camera for monitoring the conditions ahead of the vehicle is often used for grasping a positional relationship of the vehicle equipped with the in-vehicle camera relative to vehicles, persons and the like ahead of the vehicle, which are imaged by the in-vehicle camera. In this case, the occurrence of looseness in the in-vehicle camera leads to a problem that the grasped positional relationship is incorrect accordingly.

SUMMARY

In light of such circumstances, it is desired to provide an in-vehicle camera which can be attached to a windshield without permitting the windshield to come off from the vehicle or giving scratches to the windshield, or without causing looseness in the in-vehicle camera.

An in-vehicle camera according to an embodiment of the present invention includes a bracket attached to a windshield, and an in-vehicle camera body fixed to the bracket that is attached to the windshield. Of these elements, the bracket is provided with a suspending portion by which the in-vehicle camera body is suspended.

The in-vehicle camera of the invention further includes a pressing means that presses the in-vehicle camera body, which is suspended by the bracket via the hook, against a portion to be pressed of the bracket or against the hook to fix the body to the bracket.

Specifically, in the in-vehicle camera of the invention, when the in-vehicle camera body is suspended on the hook provided to the bracket, the pressing means pushes the in-vehicle camera body to sandwich the in-vehicle camera body between the pressing means and the portion to be pressed of the bracket or the hook to thereby fix the in-vehicle camera to the bracket.

Thus, the in-vehicle camera of the invention can eliminate the process of strongly pushing the bracket with a jig or the like such as for screwing, or can eliminate the use of a jig to begin with. Therefore, the in-vehicle camera body can be attached to a windshield without permitting the windshield to come off from the vehicle or scratching the windshield with a jig.

The in-vehicle camera of the invention is fixed to the bracket by being pressed, via the pressing means, against the portion to be pressed of the bracket or against the hook. Accordingly, there is no problem of causing backlash between the in-vehicle camera body and the bracket due to the tolerances.

In this way, the in-vehicle camera of the present invention reliably enables fixation of the in-vehicle camera body to a windshield.

BRIEF DESCRIPTION OF THE DRAWINGS

In the accompanying drawings:

FIG. 3 is an exploded perspective view of the in-vehicle camera of the invention;

DETAILED DESCRIPTION OF THE PREFERRED EMBODIMENTS

With reference to the drawings, hereinafter is described an embodiment of the present invention.

An in-vehicle camera of the present invention is used for imaging and monitoring the conditions ahead of the vehicle. In the following description, a forward direction is defined to be a direction to which the in-vehicle camera is oriented in a state where the in-vehicle camera is correctly mounted to the windshield of the vehicle at a predetermined position thereon to image the conditions ahead of the vehicle.

Further, the terms rearward, rightward, leftward, upward and downward used in the following description are the directions based on triangular projection with the forward direction relative to the vehicle being a front (indicated by arrows in FIG. 1), and thus the description referring such as to plan views or rear views is also based on triangular projection.

[General Structure]

Figure 1:
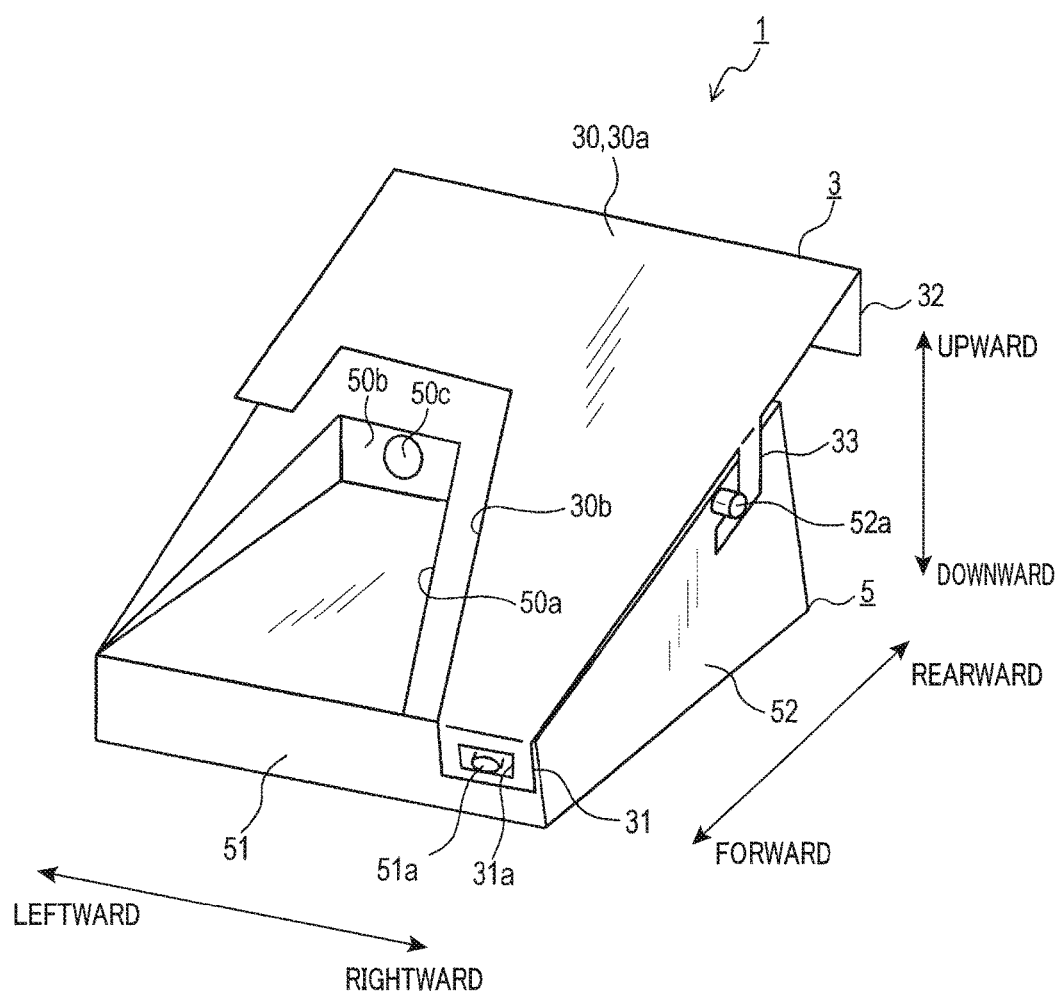
FIG. 1 is a perspective view of an in-vehicle camera of an embodiment of the present invention, as viewed from obliquely above.

As shown in FIG. 1, an in-vehicle camera 1 of the present embodiment includes a bracket 3 that is attached and fixed onto a windshield from inside the vehicle, and an in-vehicle camera body 5 that has a housing in which an imaging device and the like are accommodated.

[Bracket]

Figure 2:
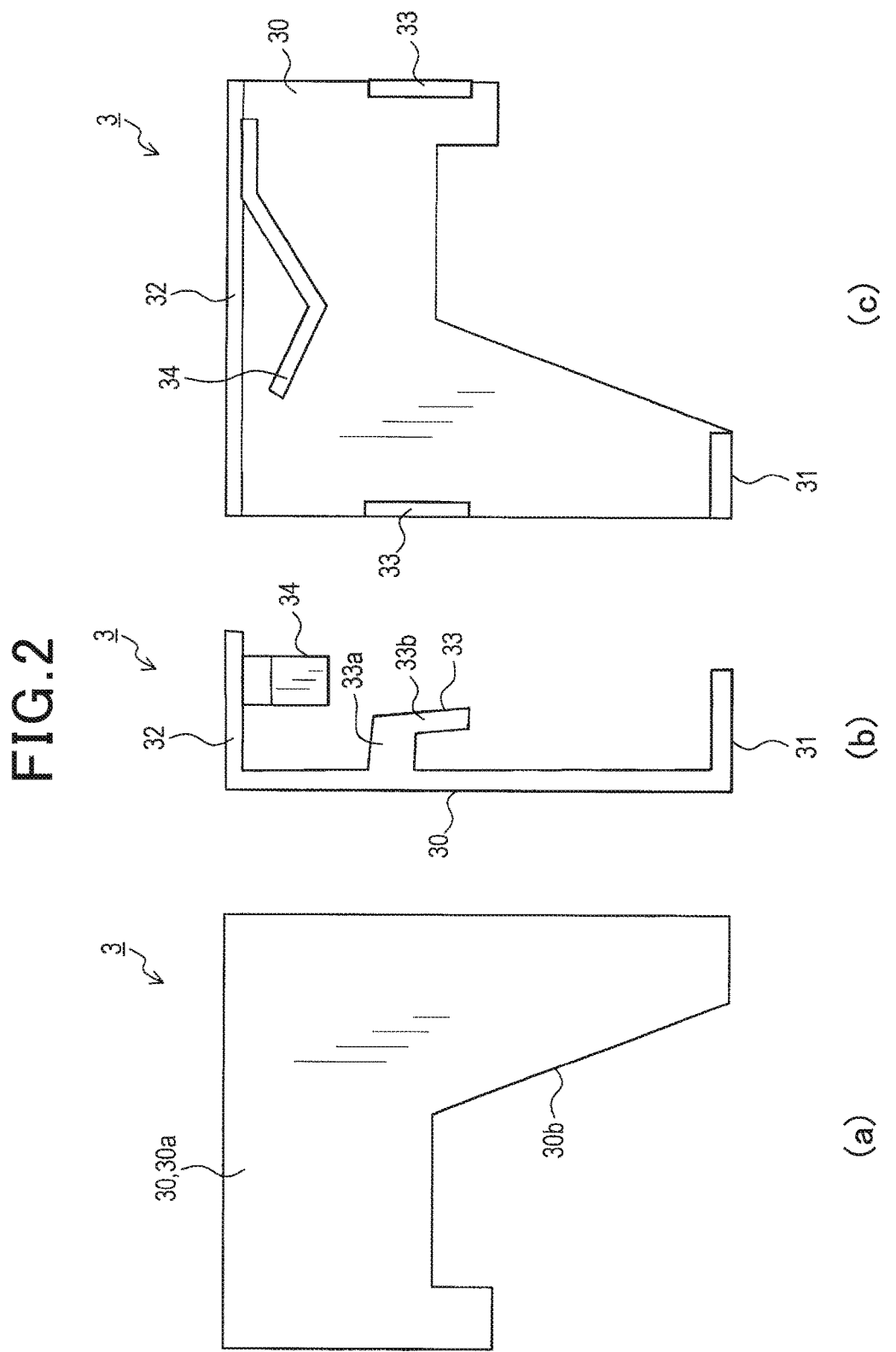
FIG. 2 shows explanatory views, on a triangular projection basis, of a bracket constituting the in-vehicle camera of the invention with (a) being a plan view, (b) being a right side view and (c) being a bottom view.

As shown in FIG. 1 and FIG. 2 by (a), the bracket 3 includes an attachment portion 30 that is attached to a windshield The attachment portion 30 includes an attachment surface 30a that is attached to a windshield. The attachment surface 30a is formed into a flat shape so as to extend along the glass surface in a portion of a windshield, to which the bracket 3 is attached.

The attachment portion 30 has a cut-off portion 30b. The cut-off portion 30b is formed by cutting off a portion by an area slightly larger than the recess 50a. The portion that is cut off includes a portion that is opposed to a recess 50a, described later, when the in-vehicle camera body 5 is mounted to the bracket 3.

The bracket 3 includes a front end portion 31 and a rear end portion 32. The front end portion 31 is a portion bent downward from a front end of the attachment portion 30 on the right of the cut-off portion 30b, i.e. a portion extended downward from the front end of the attachment portion 30. The rear end portion 32 is a portion bent downward from a rear end of the attachment portion 30, i.e. a portion extended downward from the rear end of the attachment portion 30. It should be noted that the term "bent" expresses a shape and thus should not be construed as limiting a processing method. Specifically, for example, the bracket 3 of the present embodiment is formed by press-molding a metal plate. However, this should not impose a limitation. The bracket 3 may be formed by casting or sintering. Alternatively, the bracket 3 may be made such as of a resin material.

The front end portion 31 is provided with an engagement hole 31a into which an engagement projection 51a, described later, provided to a front side surface of the in-vehicle camera body 5 is inserted and fitted.

As shown in FIG. 1 and FIG. 2 by (b) and (c), the bracket 3 includes a pair of hook portions 33 which are arranged on right and left ends of the bracket 3. Specifically, the hook portions 33 are each formed being extended from the right or left side of the attachment portion 30 so as to be perpendicular thereto, and each have a hooked end extended forward along the attachment surface 30a. The pair of hook portions 33 are positioned slightly rearward relative to the center in a longitudinal direction.

The hook portions 33 each include a base 33a and a hook 33b. The base 33a is projected downward from the attachment portion 30. The hook 33b is extended forward along the attachment surface 30a from a lower end of the base 33a and has a length larger than that of the engagement projection 51a, described later. In other words, the hook 33b is configured to restrict the movement of the suspended in-vehicle camera body 5 before fixation and to guide the camera body to a direction of a leaf spring 34 as a biasing means and a fixing portion in a direction opposite thereto in the bracket 3.

The rear end portion 32 has an inner surface (front side face) which is provided with the leaf spring 34.

In-Vehicle Camera Body

As shown in FIG. 3, the in-vehicle camera body 5 is formed into substantially a box-like shape with an upper surface 50 that is inclined upward in a direction from the front toward the rear.

The upper surface 50 of the in-vehicle camera body 5, in a plan view, has the recess 50a in a trapezoidal shape with an end on the front left being a lower base and with a right-left width narrowing toward the rear.

The recess 50a is formed so as to be deeper toward the rear to thereby form a wall surface 50b along an upper base of the recess 50a. The wall surface 50b serves as a wall for mounting a lens 50c of the camera.

The in-vehicle camera body 5 has a front side surface 51. The front side surface 51 has a right end in the vicinity of which the engagement projection 51a is formed so as to be inserted and fitted into the engagement hole 31a, mentioned above, in mounting the in-vehicle camera body 5 to the bracket 3. In the present embodiment, the engagement projection 51a is projected along a direction in which the leaf spring 34 as the biasing means is pressed. In the present embodiment, the leaf spring 34 used is one that can be pressed to an extent equal to or larger than the length of the engagement projection 51a, i.e. elastically deformed following the movement during attachment. Further, the leaf spring 34 is configured to impart a pressing force to the in-vehicle camera body 5 in a state where the engagement projection 51a is inserted and fitted into the engagement hole 31a and the in-vehicle camera body 5 is fixedly placed in position.

The in-vehicle camera body 5 also includes bosses 52a which are projected right and left from side surfaces 52 of the camera body and suspended by the respective hook portions 33 when the camera body is mounted to the bracket 3.

In a side view of the in-vehicle camera 1, the bosses 52a are each located at a position that makes shorter a distance from the front end of the engagement projection 51a to the boss 52a than a distance from the base 33a of the corresponding hook portion 33 to the front end portion 31.

Regarding Mounting Process

Figure 5:
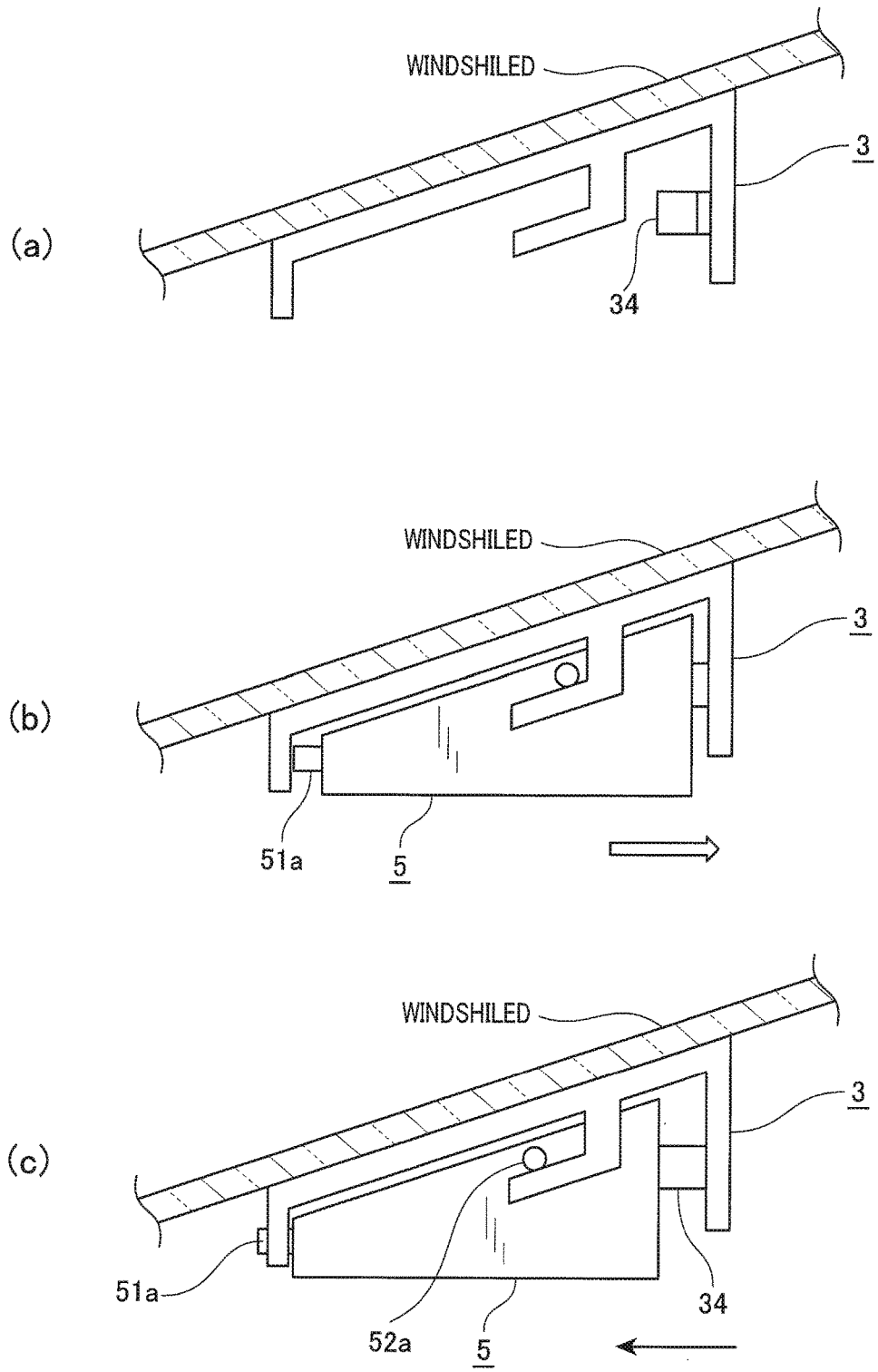
FIG. 5 shows schematic views for explaining a process of attaching the in-vehicle camera of the invention, with (a) showing a state where the bracket has been attached to a windshield, (b) showing a state where the in-vehicle camera body has been suspended on the bracket and slid toward a leaf spring and (c) showing a state where the in-vehicle camera body has been fixed to the bracket.

Referring to FIG. 5, hereinafter is described a process of mounting the in-vehicle camera 1 configured as described above to a windshield of a vehicle in the course of manufacturing the vehicle.

The in-vehicle camera 1 of the present embodiment is used for imaging the conditions ahead of the vehicle and correctly detecting the positions of lane markers as viewed from the position of the camera and the presence/absence, for example, of lighting of the head lights of oncoming vehicles. Accordingly, the in-vehicle camera 1 is required to be correctly attached to the windshield.

Therefore, the bracket 3 is correctly attached in advance to a position that enables the detection mentioned above, at a stage where a windshield has been fabricated but is yet to be put on a vehicle assembly line.

The bracket 3 is attached to the windshield by applying an adhesive to the attachment surface 30a of the bracket 3 and sticking the surface onto the windshield.

In the vehicle assembly line, the in-vehicle camera body 5 is mounted to the bracket 3 after mounting the windshield to the vehicle using an adhesive ((a) of FIG. 5) but before the adhesive dries.

In the work of mounting the in-vehicle camera body 5 to the bracket 3, the bosses 52a are firstly hooked on the respective hook portions 33, while they are slid obliquely upward in the rear from below along the glass surface of the windshield ((b) of FIG. 5).

With the sliding, the rear surface of the in-vehicle camera body 5 is eventually brought into contact with the leaf spring 34, first, to push and elastically deform the leaf spring 34.

In the present embodiment, the bosses 52a are each provided to a position that makes shorter a distance from the front end of the engagement projection 51a to the boss 52a than a distance from the base 33a of the corresponding hook portion 33 to the front end portion 31. Therefore, upon contact of each of the bosses 52a with the base 33a of the corresponding one of the hook portions 33, the in-vehicle camera body 5 can be placed relative to the bracket 3 such that the engagement projection 51a is inserted and fitted into the engagement hole 31a.

When the worker's hands that have supported the in-vehicle camera body 5 for the above work are removed after the placement, the in-vehicle camera body 5 is slightly pushed back forward by the leaf spring 34, and along with this movement, the engagement projection 51a is inserted and fitted into the engagement hole 31a ((c) of FIG. 5). In this case, the bosses 52a do not come off from the respective hook portions 33 because the hook 33b of each of the hook portions 33 is formed so as to have a larger length than the that of the engagement projection 51a.

Figure 4:
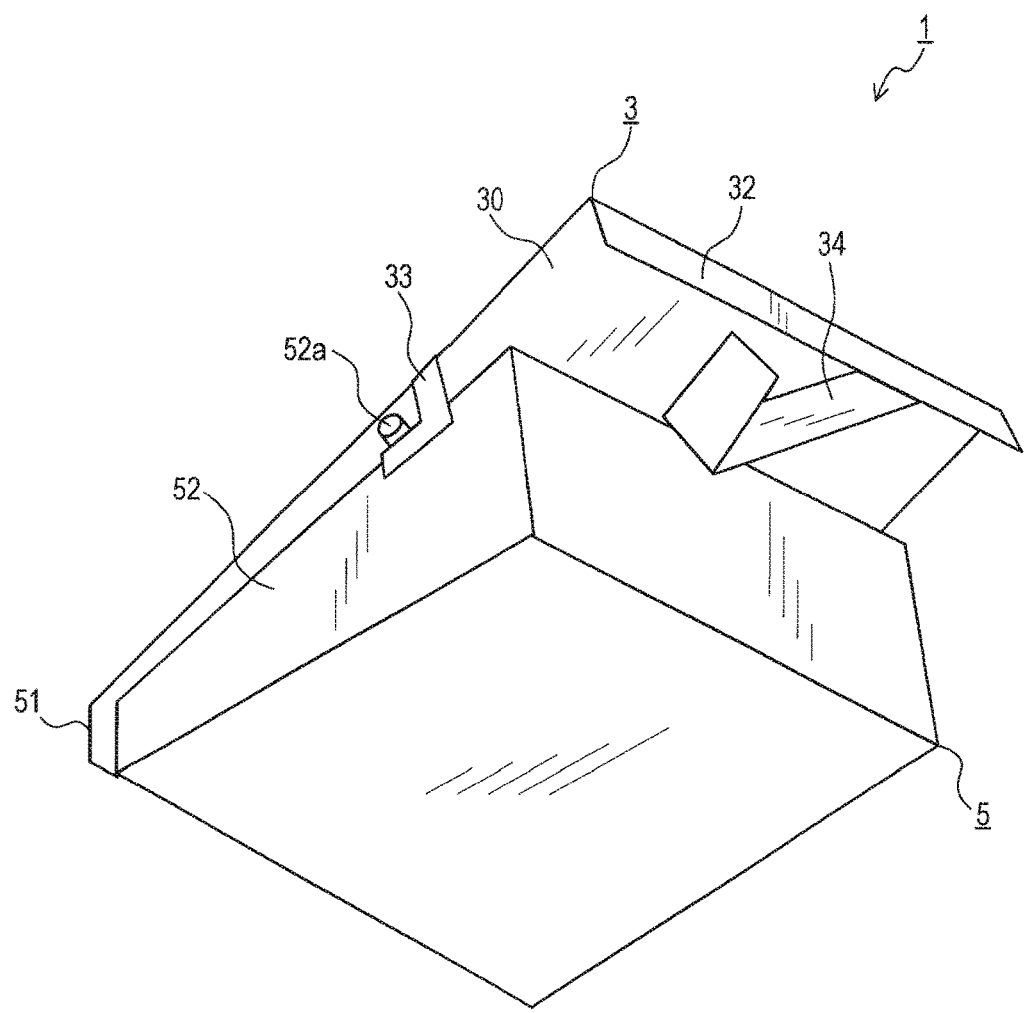
FIG. 4 is a perspective view of the in-vehicle camera of the invention, as viewed from obliquely below.

In this way, as shown in FIG. 4, the in-vehicle camera body 5 is urged by the leaf spring 34 for the insertion of the engagement projection 51a into the engagement hole 31a, while being brought into contact with the front end portion 31. Further, the upper surface 50 of the in-vehicle camera body 5 is also brought into contact with a rear surface of the attachment portion 30 (surface opposed to the in-vehicle camera body 5) so as to press the in-vehicle camera body 5 against the bracket 3 for fixation.

Advantageous Distinctive Effects and Others of the Present Embodiment

In mounting the in-vehicle camera 1 of the present embodiment, the bosses 52a of the in-vehicle camera body 5 are suspended by the respective hook portions 33 possessed by the bracket 3 that has been attached to the windshield in advance, so that the leaf spring 34 is elastically deformed. Further, the in-vehicle camera body 5 is placed at a position that enables insertion and fitting of the engagement projection 51a into the engagement hole 31a. In this state, with the removal of the worker's hands that have supported the in-vehicle camera body 5, the in-vehicle camera body 5 is pressed by the leaf spring 34 against the front end portion 31 and the attachment portion 30 of the bracket 3 and fixed.

In mounting the in-vehicle camera of the present embodiment to a windshield, no jig is required to be used such as for screwing. Therefore, the in-vehicle camera body 5 can be mounted to the windshield without permitting the windshield to come off from the vehicle by being strongly pushed by a jig or the like via the bracket 3, or without scratching the windshield by such a jig.

In the in-vehicle camera 1 of the present embodiment, the leaf spring 34 presses the in-vehicle camera body 5 against the bracket 3 for fixation. Therefore, the in-vehicle camera body 5 cannot suffer from a problem of backlash relative to the bracket 3 due to the tolerances.

Thus, in the in-vehicle camera 1 of the present embodiment, the in-vehicle camera body 5 can be reliably fixed to a windshield.

In the in-vehicle camera 1 of the present embodiment, the in-vehicle camera body 5 is hooked on the hook portions 33 via the respective bosses 52a while the engagement projection 51a is engaged with the engagement hole 31a, and the in-vehicle camera body 5 is pressed against the front end portion 31 of the bracket 3. Thus, the in-vehicle camera body 5 can be reliably fixed to the bracket 3.

Other Embodiments

In the embodiment described above, the in-vehicle camera includes a single hook portion 33. However, the in-vehicle camera may include a plurality of hook portions 33.

In the embodiment described above, the hook 33b of the hook portion 33 is extended forward from the base 33a. Alternative to this, the hook portion 33 used may have a hook 33b extended rearward from the base 33a. Still alternatively, as shown in FIG. 6 by (a) and FIG. 7 by (a), a plurality of hooked portions 33 may be provided.

In this case, the in-vehicle camera body 5 is provided with bosses 52a that mate with the respective hook portions 33. In mounting the in-vehicle camera body 5 to the bracket 3 in this case, the camera body is moved in a direction from the front toward the rear such that the bosses 52a are hooked on the respective hook portions 33 (arrows in the figure).

In the case of the in-vehicle camera 1 mentioned above, the leaf spring 34 used is one, similar to the foregoing embodiment, that can be internally arranged on the rear end portion 32 and can urge the in-vehicle camera body 5 such that the bosses 52a are brought into contact with the bases 33a of the respective hook portions 33. The engagement hole 31a and the engagement projection 51a shown in FIG. 1 do not have to be necessarily provided. As far as the in-vehicle camera body 5 can be fixed by the engagement between the bosses 52a and the respective hook portions 33, the engagement hole 31a and the engagement projection 51a may be omitted.

Figure 6:
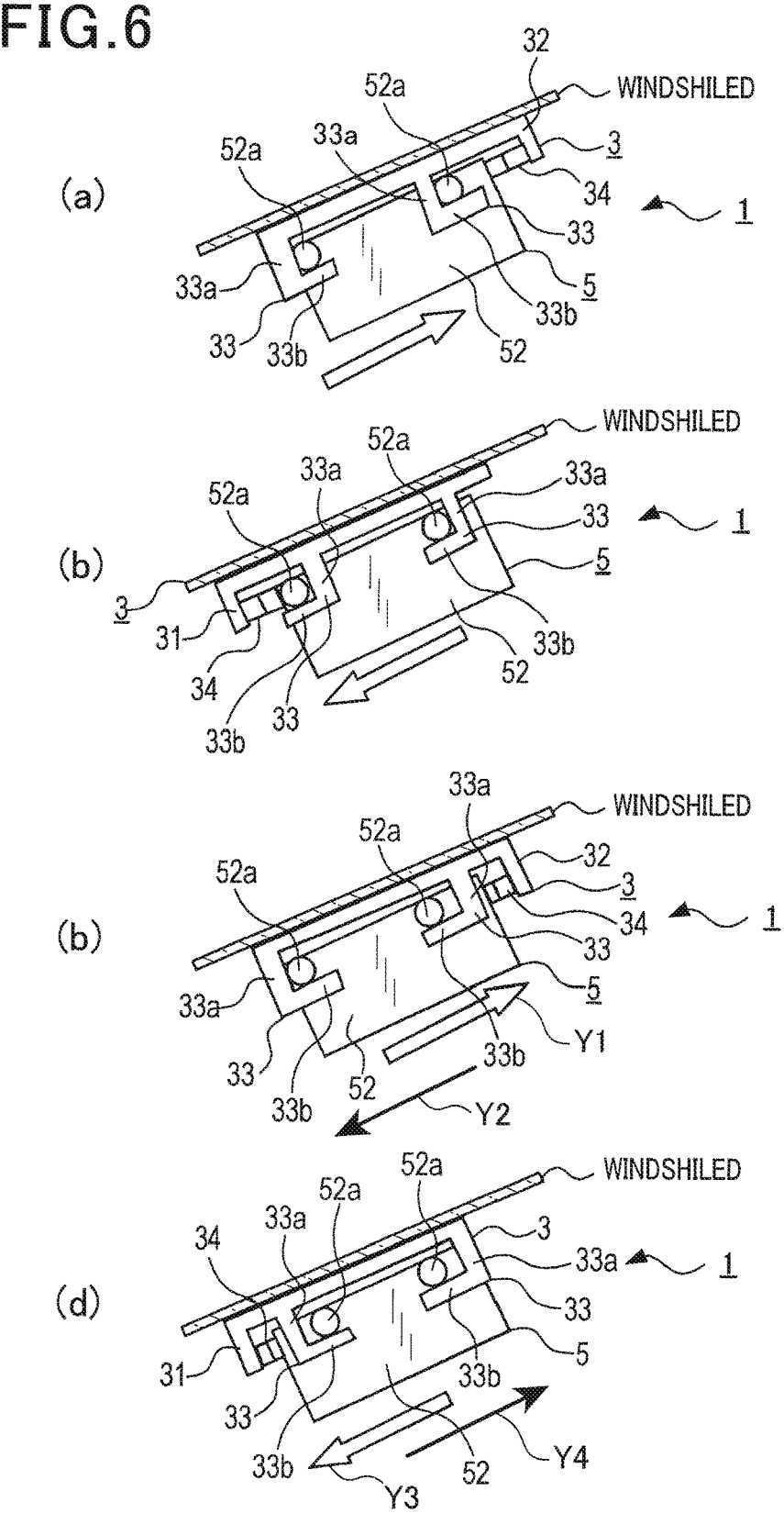
FIG. 6 shows explanatory views of other embodiments, with (a) to (d) all being right side views of an in-vehicle camera 1, as viewed from the right side.
Figure 7:
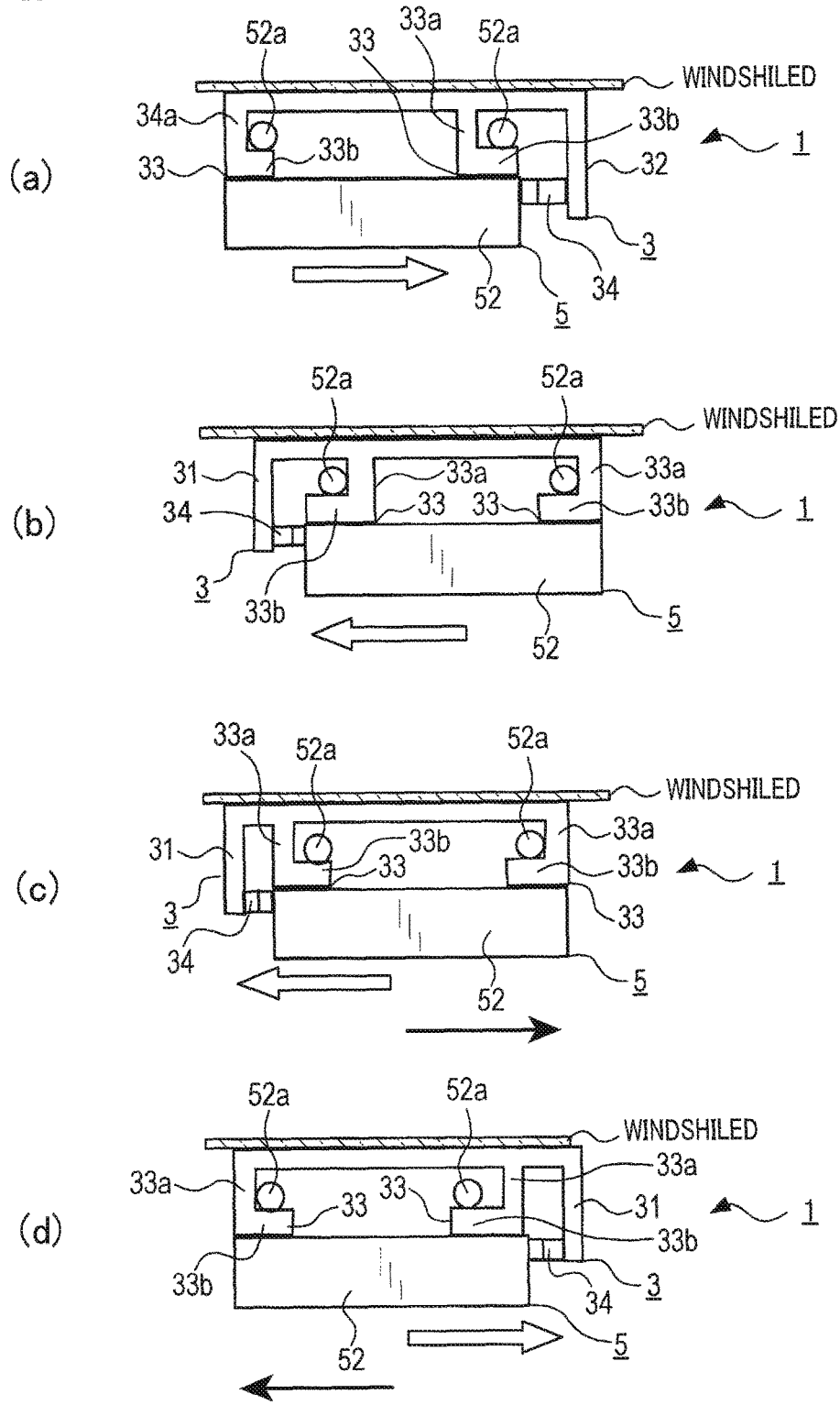
FIG. 7 shows explanatory views of other embodiments, with (a) to (d) all being right side views of an in-vehicle camera 1, as viewed from the right side.

Contrarily, as shown in FIG. 6 by (b) and FIG. 7 by (b), the plurality of hook portions 33 used may each have the hook 33b that is extended forward from the base 33a.

In this case, the in-vehicle camera body 5 is provided with bosses 52a that mate with the respective hook portions 33. In mounting the in-vehicle camera body 5 to the bracket 3, the camera body is moved in a direction from the rear toward the front such that the bosses 32a are hooked on the respective hook portions 33 (arrows in the figures).

The leaf spring 34 used in this case is one that can be internally arranged on the front end portion 31 (surface opposed to the in-vehicle camera body 5), and can urge the in-vehicle camera body 5 such that the bosses 52a are brought into contact with the bases 33a of the respective hook portions 33.

As shown in FIG. 6 by (c) and unlike the in-vehicle camera 1 described above, the hook portions 33 on the rear side may each have a hook 33b extended forward from the base 33a, while the hook portions 33 on the front side may each have a hook 33b extended rearward from the base 33a.

In the case where the in-vehicle camera 5 is fixed to the bracket 3 by being pressed against the bases 33a of the respective hook portions 33 on the front side, the leaf spring 34 is internally arranged on the rear end portion 32, similar to the foregoing embodiment.

In the in-vehicle camera 1 configured in this way, the bosses 52a to be mated with the hook portions 33 on the rear side may be hooked on the respective hook portions 33 on the rear side to thereby push the leaf spring 34 (arrow Y1). After that, the bosses 52a to be mated with the hook portions 33 on the front side may be hooked on the respective hook portions 33 on the front side to thereby allow the leaf spring 34 to urge the camera body forward (arrow Y2).

On the other hand, in the case where the in-vehicle camera body 5 is fixed to the bracket 3 by being pressed against the bases 33a of the hook portions 33 on the rear side, the leaf spring 34 is internally arranged on the front end portion 31.

In the in-vehicle camera 1 configured in this way, the bosses 52a to be mated with the hook portions 33 on the front side may be hooked on the respective hook portions 33 on the front side to thereby push the leaf spring 34 (arrow Y3). After that, the bosses 52a to be mated with the hook portions 33 on the rear side may be hooked on the respective hook portions 33 on the rear side to allow the leaf spring 34 to urge the camera body rearward (arrow Y2).

The biasing means is not limited to be provided in a longitudinal direction relative to the in-vehicle camera but may be provided such as in a right-left direction.

The bosses 52a described referring to FIG. 6 are arranged on the right or left surface of the in-vehicle camera body 5. However, the positions and shape of the bosses 52 are not limited to those described above. For example, as shown in FIG. 7 by (a) to (d), a plurality of L-shaped bosses 52a may be provided, which are permitted to uprise from the upper surface of the in-vehicle camera body 5 and extended from the upper end in a right-left direction. When the bosses 52a in this case are hooked on the respective hook portions 33, the hook 33b of each of the hook portions 33 may be ensured to be sandwiched between the corresponding one of the bosses 52a and the upper surface of the in-vehicle camera body 5.

Similarly, the positions and shape of the hooks 33b are not so limited. However, the hooks may each have a hooked shape to simplify the structure.

For example, the portions to be hooked may be the bosses 52a in a cylindrical shape, as described above, projected from the in-vehicle camera body 5. Alternatively, the portions to be hooked may each be formed into a hooked shape, or may have any other shapes.

The biasing member is not limited to a leaf spring. For example, the biasing member used may be a different spring (e.g., helical spring) or an elastic member made such as of rubber, although not limited to these.

Figure 8:
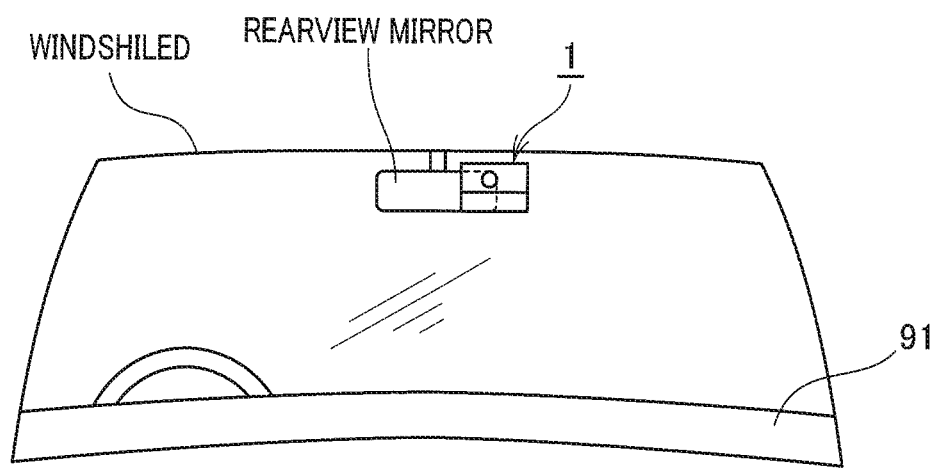
FIG. 8 is a schematic view of an example of a mounting position of an in-vehicle camera.

FIG. 8 is a diagram illustrating a windshield as viewed from the front. For example, the in-vehicle camera 1 is arranged on a portion of the windshield from inside thereof so as to be located behind a rearview mirror. However, this should not impose a limitation. For example, the in-vehicle camera 1 may be arranged in a vehicle interior so as to be located between a dash panel 91 and the windshield.

Correlation

The leaf spring 34 of the present embodiment corresponds to the pressing means and the biasing means of the present invention. Similarly, the boss 52a corresponds to the portion to be hooked, the hook portion 33 corresponds to the hook, and the front end portion 31 corresponds to the portion to be pressed.

As far as the spirit of the present invention recited in the claims is agreed with, the present invention should not be construed as being limited to the embodiment described above.

The invention claimed is:

1. An in-vehicle camera assembly comprising:
   a bracket adapted to be attached to a windshield of a vehicle;
   a camera that is supported by the bracket; and
   a pair of hook portions defined by the bracket, the pair of hook portions supporting the camera, wherein
   the bracket includes a leaf spring disposed on a rear portion of the bracket,
   the pair of hook portions are projected downwardly from both right and left sides of the bracket and are positioned rearward relative to a front-rear center of the bracket,
   the camera has a case including bosses which are projected from right and left side surfaces of the case, the bosses come into contact with the respective hook portions when the camera is mounted to the bracket, and
   the front end portion of the bracket defines an engagement portion by which an engagement projection projected from a front end portion of the case is restricted, and the pair of hook portions are configured to restrict right and left movement of the camera before fixation.

2. The in-vehicle camera assembly according to claim 1, wherein the camera is mounted to the bracket by the following steps of:
   deforming the leaf spring by the case and disposing the case so that the engagement portion and the engagement projection are arranged in a line; and
   releasing deformation of the leaf spring, so that the engagement portion and the engagement projection are engaged.

3. The in-vehicle camera assembly according to claim 1, wherein
   the leaf spring has an edge portion to be in contact with the case, and
   the case has a contact surface to be pressed by the edge portion.

4. The in-vehicle camera assembly according to claim 3, wherein
   the edge portion and the contact surface are disposed rearward relative to the hook portions.

* * * * *